Patented June 2, 1931

1,807,608

UNITED STATES PATENT OFFICE

ERNST STERN, OF BERLIN-CHARLOTTENBURG, GERMANY

METHOD OF PREPARING A CALCIUM-CARBOHYDRATE COMPOUND

No Drawing. Application filed October 2, 1926, Serial No. 139,233, and in Germany October 12, 1925.

My invention refers to a new composition of matter containing calcium in an easily soluble and assimilable form and to the method of producing same. It more particularly concerns the production of calcium preparations of agreeable taste and therapeutical value.

Hitherto calcium has mostly been used for therapeutical purposes in the form of a calcium chloride solution. Now, such solution, apart from the disagreeable taste of calcium chloride, also possesses an undesirable, strongly acidic action, 1 gram calcium chloride exerting on the human body substantially the same effect as 7.5 cc. of normal hydrochloric acid. Most of the other calcium salts are not readily soluble or, if introduced into the human body give rise to disturbances.

According to the present invention now, a calcium compound having an agreeable taste and being readily soluble and assimilable is obtained if calcium hydroxide is allowed to act under predetermined conditions on carbohydrates, more especially such as contain a sugar, either in solution or in suspension.

According to the new process the reaction is carried through at first at a moderate temperature preferably not exceeding 60° C., the concentration being increased only gradually. For instance the quantity of Ca(OH)$_2$ added during 1 hour is only 5% of the quantity of carbohydrates present in the solution or suspension. Altogether the quantity of Ca(OH)$_2$ should amount to about 5% of the quantity of carbohydrate. In the liquid system thus produced the calcium is not entirely combined, but complete combination of the calcium is caused by drying the liquid system in vacuo.

Particularly valuable products are obtained if instead of pure sugar solutions such solutions are employed which contain besides sugar also dextrin or compounds containing dextrin. Such solutions are for instance obtained by the hydrolytic or diastatic decomposition of starch flour in a suitable medium. In such case the calcium hydroxide is dissolved at once without any evil tasting by-products being formed.

The solutions obtained according to this invention will as a rule present an alkalinity, which is preferably done away with. However, if this were effected with the means usually employed, decomposition of the product and the formation of by-products having an evil taste might occur. I therefore prefer drying the solution in vacuo at a moderate temperature not exceeding 70° C. and I have found out that, contrary to what could be expected, when thus drying in vacuo, the alkalinity of the product is reduced to such a degree, that final products are obtained which practically have a neutral or only very little alkaline reaction.

I thus succeed in producing the new calcium compounds without the danger of evil tasting by-products or by-products which might impair the appearance of the product being formed at any stage of the process.

In the calcium compound thus obtained almost all the calcium is present in the form of readily soluble salts of acids, such as saccharic acid, isosaccharic acid and the like. In consequence thereof it is particularly adapted to be introduced into the blood vessels and to thus reconstitute the disturbed equilibrium of ions between sodium, potassium and calcium, which plays a very important rôle in blood serum. The new product has an agreeable taste and the favorable influence of the calcium will lessen the sensitivity of the human body against infection and will also reduce the excitability of the nervous system. It is further valuable as a remedy against infantile spasomphily and tetany as well as against asthma, hay fever and urticaria.

Example 5 kgs. calcium hydroxide are introduced in the form of a fine uniform 10% suspension into 200 kgs. of a solution obtained by diastatic decomposition of wheat or other flour, this solution containing about 25% sugar and 25% dextrin. The temperature is kept below 60° C. and the calcium hydroxide suspension is introduced in small doses during 1 hour. The mixture is then kept at 60° during a further hour and at 25 to 30° C. at least during 12 more hours. On the next day the solution is evaporated to dryness in vacuo and the dry product is ground, showing a total content of calcium of 5.08%, 88% of which has the form of readily soluble compounds. The alkali to be ascertained by titration in this product was found to be 0.2 to 0.3%. These quantities, which are formed of CaO formed by hydrolytic decomposition, are altogether innocuous, but it is possible to get rid of them altogether by subsequently admixing with the product small quantities of an acid salt, such as for instance primary sodium phosphate.

I wish it to be understood that I do not desire to be limited to the exact substances, proportions, temperatures and other details above described, for obvious modifications will occur to a person skilled in the art.

I claim:—

1. The method of producing a substantially soluble calcium compound of agreeable taste, comprising causing calcium hydroxide to act at a moderate temperature on a carbohydrate in the presence of water, gradually concentrating the mixture, finally drying in vacuo and adding an acid salt for neutralization.

2. The method of producing a substantially soluble calcium compound of agreeable taste, comprising causing calcium hydroxide to act at a moderate temperature on a carbohydrate in the presence of water, gradually concentrating the mixture, finally drying in vacuo and adding primary sodium phosphate for neutralization.

3. The method of producing a substantially soluble calcium compound of agreeable taste, comprising causing calcium hydroxide to act at a temperature not exceeding 60° C. on a solution containing carbohydrates the quantity of $Ca(OH)_2$ amounting to about 5% of the quantity of carbohydrates, the calcium hydroxide being added to the solution at the rate of about 5% of the quantity of carbohydrates in solution per hour, and finally drying in vacuo.

4. The method of producing a substantially soluble calcium compound of agreeable taste, comprising causing calcium hydroxide to act at a temperature not exceeding 60° C. on a solution containing sugar, the quantity of $Ca(OH)_2$ amounting to about 5% of the quantity of sugar, the calcium hydroxide being added to the solution at the rate of about 5% of the quantity of sugar in solution per hour, and finally drying in vacuo.

In testimony whereof I affix my signature.

ERNST STERN.